United States Patent
Miller

(10) Patent No.: US 9,118,704 B2
(45) Date of Patent: Aug. 25, 2015

(54) HOMOGLYPH MONITORING

(71) Applicant: HEWLETT-PACKARD DEVELOPMENT COMPANY, L.P., Houston, TX (US)

(72) Inventor: Joseph A. Miller, Herndon, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 153 days.

(21) Appl. No.: 13/659,677

(22) Filed: Oct. 24, 2012

(65) Prior Publication Data
US 2014/0115704 A1  Apr. 24, 2014

(51) Int. Cl.
*H04L 29/06* (2006.01)
*G06F 21/56* (2013.01)

(52) U.S. Cl.
CPC .......... *H04L 63/1416* (2013.01); *G06F 21/566* (2013.01); *H04L 63/126* (2013.01)

(58) Field of Classification Search
CPC .. H04L 63/1483; H04L 63/126; G06F 21/566
USPC .......................................... 726/23; 713/154
See application file for complete search history.

(56) References Cited

U.S. PATENT DOCUMENTS

| 8,266,295 B2 | 9/2012 | Klein et al. |
| 2006/0168028 A1 | 7/2006 | Duxbury et al. |
| 2007/0083670 A1 | 4/2007 | Kelley et al. |
| 2010/0313266 A1 | 12/2010 | Feng et al. |

FOREIGN PATENT DOCUMENTS

WO   WO-2006026921 A2   3/2006

OTHER PUBLICATIONS

Hannay, P., et al., The 2010 IDN Homograph Attack Mitigation Survey, Sep. 16, 2010, On pp. 611-614. < http://data.openduck.com/wp-posts/2010/07/paper-homograph/hannay-bolan-homograph.pdf >.

Helou, J.A., et al., Multilingual Web Sites: Internationalized Domain Name Homograph Attacks, Sep. 17-18, 2010, on pp. 89-92. < http://ieeexplore.ieee.org/stamp/stamp.jsp?arnumber=5623562 >.

*Primary Examiner* — Dao Ho
(74) *Attorney, Agent, or Firm* — Mannava & Kang

(57) ABSTRACT

A homoglyph monitoring system includes an attack vector string matching module to determine potential attack vector strings for a target domain name. Each potential attack vector string includes a different homoglyph of a character in the target domain name. The system includes a domain name system (DNS) analyzer module to facilitate lookups on DNS servers based on the potential attack vector strings and to identify a DNS record including a potential attack vector string.

13 Claims, 4 Drawing Sheets

HOMOGLYPH MONITORING

BACKGROUND

Internet security has become a hot topic given the number of fraudulent schemes that are being perpetrated on the Internet. One type of fraudulent scheme may use a homoglyph attack to spoof a domain name. For example, the spoofed domain name directs a user to a phishing website that masquerades as a trustworthy website, such as the user's banking website. The phishing website may fraudulently solicit the user's confidential information, such as a credit card number, account number, social security number, password, etc. A homoglyph attack may include mixing characters from multiple languages to create a spoofed domain name that looks the same as the real domain name but actually contains different characters. A phishing email may include the spoofed domain name in order to direct a user to the phishing website.

BRIEF DESCRIPTION OF DRAWINGS

The embodiments are described in detail in the following description with reference to examples shown in the following figures.

DETAILED DESCRIPTION OF EMBODIMENTS

Figure 1:
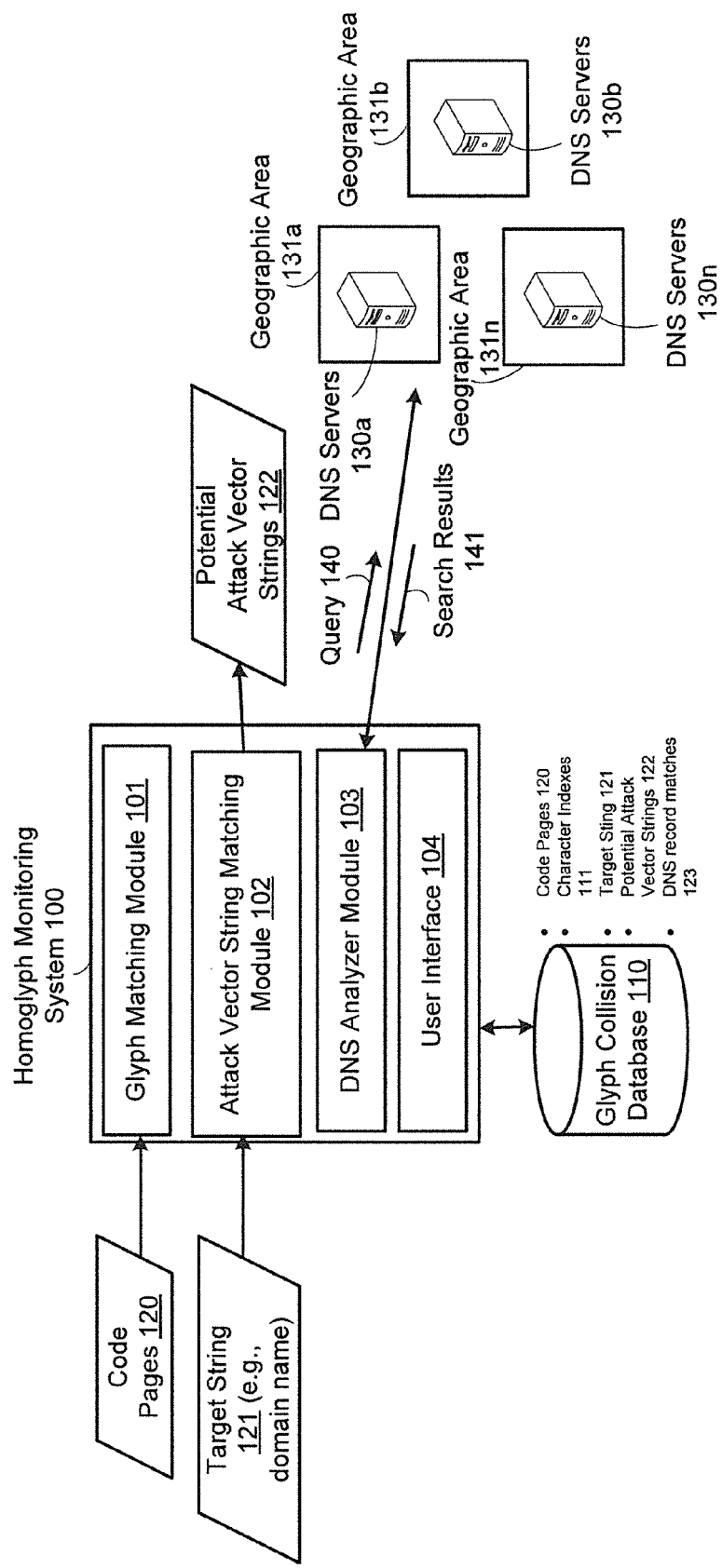
FIG. 1 illustrates a system.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

According to an embodiment, a system provides monitoring and notification of homoglyph attacks that may utilize uncontrolled Domain Name System (DNS) services as tactical support for an attack. A homoglyph is a character with a shape that appears identical or similar to a shape of another different character. The homoglyph may not be differentiated from its related character by quick visual inspection. For example, a domain name may include hp.com. A homoglyph of 'p' in hp.com may be the Cyrillic 'p' character. The Cyrillic 'p' character looks the same as the 'p' in hp.com but is actually a character in a different language. The homoglyph has a different hexadecimal value in Unicode than the 'p' in hp.com. Unicode is a computing industry standard for the handling of characters in many different languages. Unicode assigns a unique character code (e.g.; hexadecimal value) to each character. Different characters, which includes characters in different languages, are represented by different hexadecimal values.

A homoglyph attack may include creating an attack vector string to represent a target string with one or more homoglyphs. For example, the target string is a domain name such as hp.com. The attack vector string substitutes the 'p' with the Cyrillic 'p' character to create an attack vector string that looks very similar to the target string. The attack vector string may be used to trick users who misinterpret the attack vector string as the target domain name when it is viewed. The attack vector string and the target string comprise a plurality of characters. Each character may be a Unicode character identifiable by a unique value.

The system may identify potential attack vector strings for domain names and store the potential attack vector strings in a database. The system may monitor DNS services to detect if a potential attack vector string is being used by a DNS service. If a potential attack vector string is detected, then corrective actions may be performed.

The DNS services that are monitored may include domain name resolution that resolves queries for domain names into Internet Protocol (IP) addresses to locate computer services and devices. A DNS server stores records including domain names and their corresponding IP addresses. The DNS records are checked to determine whether they include any potential attack vectors. DNS servers may be monitored by geographic region. A potential attack vector in a DNS record may direct a user to a phishing website. If a potential attack vector is detected in a DNS record, then a corrective action may be performed, for example, to remove the record.

FIG. 1 illustrates a homoglyph monitoring system 100. The system 100 includes a glyph matching module 101, an attack vector string matching module 102, a DNS analyzer module 103, and a user interface 104. The components of the system 100, including the modules, may comprise hardware, computer code comprised of machine readable instructions or a combination thereof. The machine readable instructions may be stored on a storage device and executed by one or more processors. The system 100 may include a data storage system to store any data used by the system 100. For example, the system 100 includes a glyph collision database 110 to store character indexes 111 and other information used or generated by the system 100.

The glyph matching module 101 generates character indexes 111. For example, the glyph matching module 101 compares characters to identify homoglyphs for each character and creates an index for each character that includes the homoglyphs determined from the comparisons. In one example, the glyph matching module 101 receives code pages 120 that include characters in different languages and Unicode values for each character. The glyph matching module 101 compares each character in the code pages 120 to the other characters in the code pages 120 to identify the homoglyphs for each character. An index is created for each character. The index for the character identifies its homoglyphs and associated metadata, which may include Unicode values and stores the character indexes 111 in the glyph collision database 110.

Identifying homoglyphs for a target character may include determining a measure of similarity between the target character and each character that is compared to the target character. Character recognition features may be used to determine similarities between characters. For example, a set of features is extracted for each character. A feature may include a portion of a character, such as straight line or a curve or an intersection between two lines. The extracted features of a target character are compared to features of other characters to determine a similarity measure between the characters. The comparison may include determining whether the characters have similar angled lines, curves, lengths and intersection points. This comparison is performed to create a match rating list of characters which is sorted in descending order according to the similarity measures. The top match and any close matches may be selected as homoglyphs for the target character and put into the index for the target character along with their similarity measures. In one example, a similarity measure is a percentage, such as 80% similarity.

The attack vector string matching module 102 determines potential attack vector strings 122 for a target string 121 based on the character indexes 111. For example, the attack vector string matching module 102 receives a target string 121 that is a domain name. In one example, the target string 121 is provided by a user via the user interface 104. Instead of a domain name, the target string 121 may be a file name or a name of another computer resource. In one example, the target string 121 is domain name 'hp.com'. The attack vector string matching module 102 identifies each character from hp.com (including the root '.com'). Homoglyphs for each character are determined from a lookup in the character indexes 111. A threshold for the similarity measure may be used to identify the homoglyphs. For example, homoglyphs from the index that have a 90% or greater similarity measure with the target character are identified. Accordingly, a set of homoglyphs for each character in hp.com are determined. From combinations of homoglyphs in the sets of homoglyphs, potential attack vector strings 122 are determined for hp.com. For example, one homoglyph is selected from the set of homoglyphs for the character 'h'; one homoglyph is selected from the set of homoglyphs for the character 'p'; one homoglyph is selected from the set of homoglyphs for the character 'c'; and so on to create a potential attack vector string. This process is repeated for different homoglyphs selected from each set to identify different potential attack vector strings for the target string which is hp.com in this example. In this example, each potential attack vector string is a potential domain name for a phishing website masquerading as hp.com. Homoglyphs may be determined for one or more of the characters to identify one or more potential attack vector strings 122 for the target string 121.

Depending on the number of homoglyphs in each set, there could be hundreds of thousands of potential attack vector strings 122. Due to limitations in bandwidth, data storage, CPU cycles, etc., a subset of the potential attack vector strings 122 may be selected for the DNS record searching. The number of potential attack vector strings 122 may be reduced by selecting a minimum similarity threshold. For example, the similarity measures for each homoglyph in a potential attack vector string are averaged to determine a similarity measure for the potential attack vector string. If the similarity measure for the potential attack vector string is below a minimum similarity threshold then the potential attack vector string is not considered a potential attack vector string. However, if the similarity measure is greater than or equal to the threshold, then it is considered a potential attack vector string.

Tuning may be used to adjust similarity measures or similarity thresholds. Tuning may comprise considering additional factors to determine or adjust a similarity measure. In one example, similarity measures may be adjusted based on demographic. For example, if a website is frequented by senior citizens, then similarity measures in the character indexes 111 may be adjusted to account for senior citizens being more susceptible to homoglyph attacks. Thresholds may be adjusted. For example, thresholds may be reduced for an elderly demographic in order to include potential attack vector strings that typically may be considered less risky for a non-elderly demographic. In one example, the tuning may include manual side-by-side comparison of characters or strings to adjust similarity measures. Target strings and potential attack vectors may be stored in the glyph collision database 110.

DNS analyzer module 103 identifies DNS servers in target geographic areas and checks for the potential attack vector strings 122 in the DNS records of the DNS servers. DNS servers are provided in multiple different geographic areas around the world. FIG. 1 shows DNS servers 130$a_,$, 130$b$, and 130$n$, in different geographic areas 131$a_,$, 131$b$, and 131$n$. The different geographic areas may represent different countries or regions. All the DNS servers may be searched or DNS servers in specific geographic locations may be searched. The IP addresses for the DNS servers may be stored and the geographic location for each DNS server may be stored, so targeted searching of the DNS servers can be performed. The DNS analyzer module 103 sends a query 140 to DNS servers in one or more of the geographic areas 131$a_,$, 131$b$, and 131$n$, to determine whether any of the DNS records in the DNS servers 130$a_,$, 130$b$, or 130$n$, include any of the potential attack vector strings 122. The DNS analyzer module 103 receives search results 141. The search results 141 may indicate that one or more of the DNS servers 130$a_,$, 130$b$, or 130$n$, include one or more of the potential attack vector strings 122, which are DNS record matches 123. If DNS record matches 123 are found, actions may be performed. For example, notifications may be generated that identify the DNS record matches 123. The notifications may be sent to administrators and authorities. The IP addresses for the DNS record matches 123 may be obtained to try locate the machines and the owners. Actions may be taken to flag and remove the DNS record matches 123 from their respective DNS servers.

User interface 104 may be a graphical user interface that may be used for receiving target strings, tuning similarity measures, displaying reports, or for performing other user interactions with the system 100.

Figure 2:
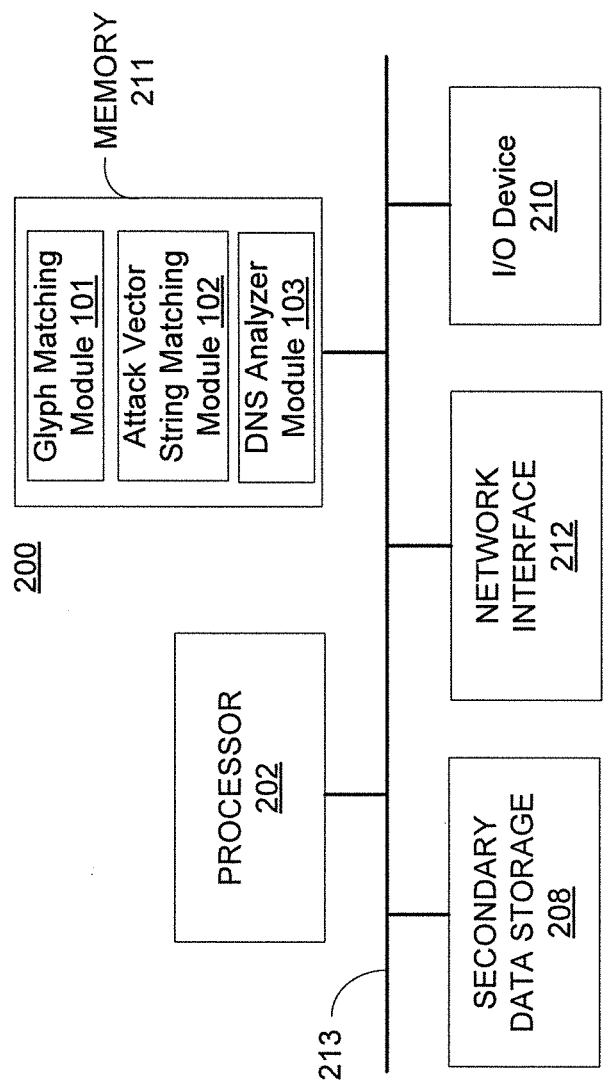
FIG. 2 illustrates a computer system that may be used as a hardware platform for the system and methods described herein.

FIG. 2 illustrates a computer system 200 that may be used as a platform for the system 100. The computer system 200 represents a generic platform that includes components that may be in a server or another computer system. The computer system 200 may execute, by one or more processors or other hardware processing circuits, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 200 includes a processor 202 that may implement or execute machine readable instructions performing some or all of the methods, functions and other processes described herein. Commands and data from the processor 202 are communicated over a communication bus 213. The computer system 200 also includes a main memory 211, such as a random access memory (RAM), where the machine readable instructions and data for the processor 202 may reside during runtime, and a secondary data storage 208, which may be non-volatile and stores machine readable instructions and data. For example, machine readable instructions for the glyph matching module 101, the attack vector string matching module 102 and the DNS analyzer module 103 may reside in the memory 211 during runtime and may be stored in the secondary data storage 208. The memory 211 and secondary data storage 208 are examples of computer readable mediums.

The computer system 200 may include an I/O device 210, such as a keyboard, a mouse, a display, etc. For example, the I/O device 210 includes a display for the user interface 104 to display reports, notifications or other information. The computer system 200 may include a network interface 212 for connecting to a network, such as the Internet. For example, the computer system 200 may communicate with the DNS servers 130*a,*, 130*b,* and 130*n,* via the network interface 212. Other known electronic components may be added or substituted in the computer system 200. The system 100 may be executed on a single computer system or on multiple computer systems. For example, the glyph collision database 110 may be hosted on a database server and the modules 101-104 may be hosted on one or more other servers. The system 100 may be hosted in a distributed computing environment, such as a cloud computer environment.

Figure 3:
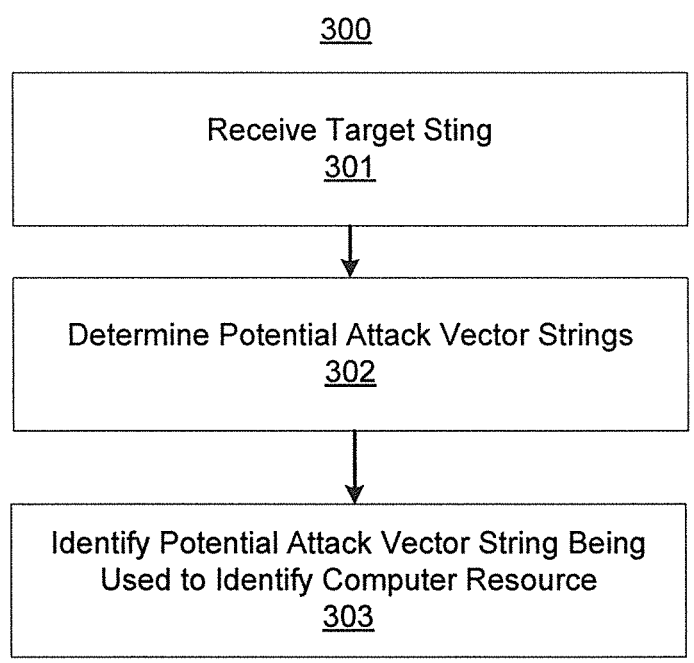
FIGS. 3 and 4 illustrate methods.

FIG. 3 illustrates a method 300. The method 300 is described with respect to the homoglyph monitoring system 100 shown in FIG. 1 by way of example. At 301, a target string is received. The target string may be a name of a computer resource. For example, the target string 121 shown in FIG. 1 may be a domain name. In other example, the target string 121 is a file name.

At 302, potential attack vector strings for the target string 121 are determined. For example, the attack vector module 102 shown in FIG. 1 determines potential attack vector strings 122 for the target string 121. The character indexes 111 may be searched to identify homoglyphs and similarity measures for the characters in the target string 121. The homoglyphs and the similarity measures may be used to generate the potential attack vector strings 121. For example, if the target string is "hp.com". Homoglyphs for one or more of the characters in "hp.com" are substituted to create a potential attack vector string. For example, the Cyrillic 'p' replaces the 'p' in hp.com to create a potential attack vector string. Another potential attack vector string may include a homoglyph replacing the 'h'. Another potential attack vector string may include a string with both the 'h' and 'p' replaced with homoglyphs. There may be thousands of potential attack vector strings that can be generating by combinations of homoglyphs for characters in the target string 121. The similarity measures and a minimum similarity threshold may be used to reduce the number of potential attack vector strings 121, as is further described below.

At 303, a potential attack vector string of the strings 122 is identified as being used to identify a computer resource. For example, the DNS analyzer module 103 shown in FIG. 1 may generate the query 140 that includes the potential attack vector strings 122 or a subset of the strings 122. The query 140 is sent to DNS servers in one or more of the geographic areas 131, 131*b,*, 131*n,* to determine whether any DNS records in the DNS servers contain any of the potential attack vector strings 122. The DNS servers search their DNS records to determine whether they include any of the potential attack vector strings 122. The search results 141 are sent from the DNS servers to the system 100 and the DNS analyzer module 103 analyzes the search results to identify the matches 122. The search results 141 indicate whether the DNS records contain any of the potential attack vector strings 122. If any of the potential attack vector strings 122 are in the DNS records, the search results 141 may identify the specific DNS records containing particular ones of the potential attack vector strings 122. Remedial action may be taken, such as sending notifications to users, system administrators, etc., of the DNS records containing potential attack vector strings. Actions may be taken to remove the identified DNS records from the DNS servers 130.

Figure 4:
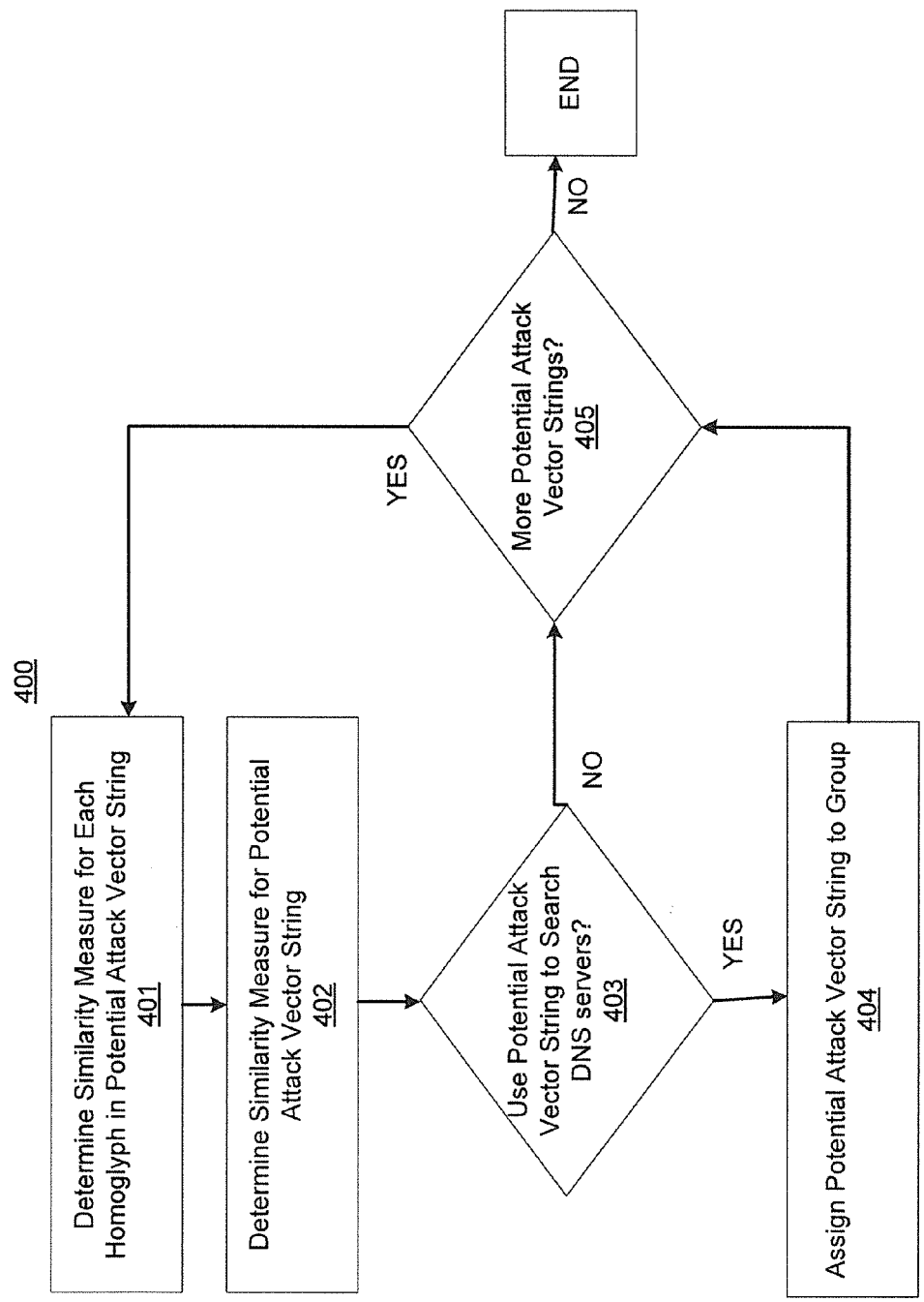

FIG. 4 illustrates a method 400. The method 400 includes substeps for 302 in the method 300. At 401, similarity measures are determined for each homoglyph in a potential attack vector string determined for the target string 121. A similarity measure between a character and a homoglyph may be stored for each homoglyph in the character indexes 111.

At 402, the similarity measures are combined according to a function to determine a similarity measure for the potential attack vector string. For example, the similarity measures may be averaged to determine the similarity measure for the potential attack vector string. If there is only one homoglyph in the potential attack vector string then the similarity measure for the homoglyph may be used as the similarity measure for the potential attack vector string.

At 403, the similarity measure for the potential attack vector string is compared to a minimum similarity threshold to determine whether the potential attack vector string should be used to search DNS servers in targeted geographic areas. For example, if the similarity measure for the potential attack vector string is greater than or equal to the minimum similarity threshold, the potential attack vector string is considered to be sufficiently, visually similar to the target string 121 that it may be mistaken for the target string 121. At 404, the potential attack vector string is assigned to a group of potential attack vector strings, and the potential attack vector strings in the group are used to search DNS records, for example, at 303 in the method 300. If, for example, the similarity measure for the potential attack vector is below the minimum similarity threshold, the potential attack vector string is not included in the group of potential attack vector strings that are to be used to search the DNS records.

At 405, a determination is made as to whether there are any more potential attack vector strings for the target string 121 to be considered. For example, at 302, many potential attack vector strings may be determined using homoglyphs for the characters in the target string 121. 401-404 may be performed for each potential attack vector string to compare similarity measures for the potential attack vector strings to the minimum similarity threshold. If all the potential attack vectors have been compared, the method 400 is complete. All the potential attack vector strings having a similarity measure greater than or equal to the similarity threshold, which are also assigned to the group, are sent, for example, to the DNS servers in the target geographic areas in the query 140 to check the DNS records.

Tuning may be used to adjust similarity measures for a potential attack vector or to adjust the similarity threshold. In one example, the tuning may include manual side-by-side comparison of a potential attack vector to the target string 121 to determine whether to adjust a similarity measure.

While the embodiments have been described with reference to examples, various modifications to the described embodiments may be made without departing from the scope of the claimed embodiments.

What is claimed is:

1. A homoglyph monitoring system comprising:
   a memory to store machine readable instructions; and
   at least one processor to execute the machine readable instructions in the memory to:
      receive a target domain name,
      create potential attack vector strings based on the target domain name, including:
         identify a homoglyph in an index of homoglyphs that is similar to a character in the target domain name,
         determine whether a similarity between the homoglyph and the character of the target domain name is greater than a minimum similarity threshold, and
         in response to a determination that the similarity is greater than the minimum similarity threshold, replace the character in the target domain name with the homoglyph to create one of the potential attack vector strings; and facilitate searching domain name system (DNS) servers in a target geographic region based on the potential attack vector strings and determine from results of the searching whether a DNS record in the results includes one of the potential attack vector strings.

2. The homoglyph monitoring system of claim 1, wherein the at least one processor is further to execute the machine readable instructions to:
store the index of homoglyphs for each character of a plurality of characters in a glyph collision database in the memory.

3. The homoglyph monitoring system of claim 2, wherein the index of homoglyphs further includes a similarity measure for each homoglyph describing an amount of similarity between a character and the homoglyph.

4. The homoglyph monitoring system of claim 3, wherein the at least one processor is further to execute the machine readable instructions to receive an adjustment to the minimum similarity threshold or the similarity measures in the index via a user interface and store the adjustment in the glyph collision database.

5. The homoglyph monitoring system of claim 4, wherein the adjustment is based on a demographic associated with the target domain name.

6. A non-transitory computer readable medium including machine readable instructions executable by at least one processor to:
receive a target string;
create potential attack vector strings based on the target string, including:
identify a homoglyph in an index of homoglyphs that is similar to a character in the target string,
determine whether a similarity between the homoglyph and the character of the target string is greater than a minimum similarity threshold, and
in response to a determination that the similarity is greater than the minimum similarity threshold, replace the character in the target string with the homoglyph to create one of the potential attack vector strings; and
determine whether one of the potential attack vector strings is being used to identify a computer resource.

7. The non-transitory computer readable medium of claim 6, wherein in response to a determination that one of the potential attack vector strings is being used to identify the computer resource, the machine readable instructions executable by the at least one processor are to perform a remedial action to facilitate removal of the potential attack vector string from being used to identify the computer resource.

8. The non-transitory computer readable medium of claim 6, wherein the machine readable instructions executable by the at least one processor are to store the index of homoglyphs for each character of a plurality of characters in a glyph collision database.

9. The non-transitory computer readable medium of claim 6, wherein the index of the homoglyphs further includes a similarity measure for each homoglyph describing an amount of similarity between a character and the homoglyph.

10. The non-transitory computer readable medium of claim 9, wherein the machine readable instructions executable by the at least one processor are to:
receive an adjustment to the minimum similarity threshold or the similarity measures in the index based on a demographic associated with the target string and adjust the minimum similarity threshold or the similarity measures based on the adjustment.

11. A method comprising:
receiving a target domain name;
creating, by at least one processor, potential attack vector strings based on the target domain name, including:
identifying a homoglyph in an index of homoglyphs that is similar to a character in the target domain name,
determining whether a similarity between the homoglyph and the character of the target domain name is greater than a minimum similarity threshold, and
in response to a determination that the similarity is greater than the minimum similarity threshold, replace the character in the target domain name with the homoglyph to create one of the potential attack vector strings;
searching domain name system (DNS) servers in a target geographic region based on the potential attack vector strings; and
determining from search results of the DNS server searching, whether a DNS record in the search results includes one of the potential attack vector strings.

12. The method of claim 11, comprising:
in response to a determination that a DNS record in the search results includes one of the potential attack vector strings, performing a remedial action to facilitate removal of the DNS record.

13. The method of claim 11, comprising:
storing the index of homoglyphs for each character of a plurality of characters in a glyph collision database.

* * * * *

UNITED STATES PATENT AND TRADEMARK OFFICE
CERTIFICATE OF CORRECTION

| | | |
|---|---|---|
| PATENT NO. | : 9,118,704 B2 | Page 1 of 1 |
| APPLICATION NO. | : 13/659677 | |
| DATED | : August 25, 2015 | |
| INVENTOR(S) | : Joseph A. Miller | |

It is certified that error appears in the above-identified patent and that said Letters Patent is hereby corrected as shown below:

In the Drawings

In sheet 3 of 4, reference numeral 301, line 1, delete "STING" and insert -- STRING --, therefor.

In the Specification

In column 4, line 2, delete "130a,," and insert -- 130a, --, therefor.

In column 4, line 3, delete "131a,," and insert -- 131a, --, therefor.

In column 4, line 11, delete "131a,," and insert -- 131a, --, therefor.

In column 4, line 13, delete "130a,," and insert -- 130a, --, therefor.

In column 4, line 16, delete "130a,," and insert -- 130a, --, therefor.

In column 5, line 1, delete "130a,," and insert -- 130a, --, therefor.

In column 5, line 45, delete "131b,," and insert -- 131b, --, therefor.

Signed and Sealed this
Third Day of May, 2016

Michelle K. Lee
*Director of the United States Patent and Trademark Office*